3,127,241
PREPARATION OF MAGNESIUM HYDROXIDE
John N. Periard and George W. Waldron, Bay City, Mich., assignors to The Dow Chemical Company, Midland, Mich., a corporation of Delaware
No Drawing. Filed Feb. 16, 1961, Ser. No. 89,658
3 Claims. (Cl. 23—201)

This invention relates to a process for the preparation of magnesium hydroxide. More particularly, it pertains to a process for the preparation of magnesium hydroxide in a loosely agglomerated particle form which may be easily filtered, washed, and converted to fine crystals of magnesium hydroxide.

There are numerous demands for a fine particle size magnesium hydroxide. A fine particle size product is desired when it is necessary to maintain the magnesium hydroxide suspended in a dilute aqueous slurry. Also a fine size particle may be advantageous since upon calcining it may be used in the preparation of periclases of improved properties such as lower porosity. Certain forms of calcined magnesium hydroxide are utilized in the chemical field due to the activity of the product. A small particle size is desirable for this utility. A higher surface area and thus a higher activity is generally obtained with a smaller particle. While a product of small particle size, viz. less than a micron, may be prepared, the recovery of the product is difficult. It is difficult to filter, settle, or to wash free of soluble salts. Thus, it is greatly desirable to have a process by which the magnesium hydroxide may be prepared in a loosely aggregated form which may be easily filtered and then easily mechanically dispersed to obtain a fine particle size product. In addition, it is often necessary to have a high purity product.

It is therefore an object of this invention to provide a process for the preparation of magnesium hydroxide. Another object is to provide a process for the preparation of a magnesium hydroxide of high purity. A still further object is to provide a process for the preparation of high purity magnesium hydroxide in the form of an easy filterable aggregate of crystals, the aggregate being capable of disintegration into fine particles of magnesium hydroxide.

The above and other objects are attained according to this invention by mixing an aqueous solution of a magnesium salt, such as magnesium chloride or magnesium sulfate, with an aqueous alkali metal hydroxide solution such as potassium or sodium hydroxide at a temperature in the range of 15° to 75° C. for from 1/4 to 2 hours to react the magnesium salt with the hydroxide. The aqueous solutions are intermixed in proportions such that the "soluble alkalinity" of a sample of the filtrate of the reacting mixture as measured by the herein described titration test with a $\frac{1}{10}$ normal solution of hydrochloric acid is in the range of 1/2 to 5 ml. of the acid solution. In carrying out the reaction in the above limited conditions of temperature and alkalinity, the magnesium hydroxide product is obtained in the form of agglomerated or aggregated fine crystals which may be easily disintegrated in water by a mechanical means. Thus, the aggregated crystals may be easily recovered from the reaction mixture by settling or filtering and then subjected to the action of mechanical force to homogenize or disintegrate the agglomerated crystals into essentially all fine particles having a size of from 0.1 to 0.5 micron. The product is of high purity and when disintegrated into fine particles will form a relatively stable suspension which is a desirable characteristic of the magnesium hydroxide product when it is used for pharmaceutical purposes. Also, the product may be calcined to a low density and high activity magnesium oxide which may be used as an adsorbent or for other purposes where a high activity magnesium oxide is desirable. In addition, when suitably calcined, the product produces a high density low porosity periclase.

In the reaction of the magnesium salt with the hydroxide, it is essential to closely control the alkalinity of the reacting mixture and the reaction temperature. The reaction temperature must be maintained below 75° C. to obtain the loosely bound aggregate of fine crystals of magnesium hydroxide which form in the reaction. At a reaction temperature of 75° C. and above, a less easily filterable magnesium hydroxide product is obtained, and the particles cannot be as easily disintegrated into fine crystals of magnesium hydroxide. Generally, the reaction is carried out at a temperature in the range of 40° to 60° C., although a temperature as low as 15° C. may be used. No particular advantage is gained in employing a reaction temperature below room temperature.

The alkalinity of the reaction mixture is also critical and must be maintained at a "soluble alkalinity" in the range of 1/2 to 5 milliliters (ml.). By the term "soluble alkalinity," as used herein, means the number of milliliters of standard 0.1 N HCl solution required to titrate to the phenolphthalein end point a 100 milliliter sample of the mother liquor of the reaction mixture. In determining the soluble alkalinity, a sample of the reaction mixture is filtered to remove the precipitated magnesium hydroxide until a 100 milliliter sample of the mother liquor is obtained. To the 100 milliliters of mother liquor, standard 0.1 N HCl solution is added to titrate it to the phenolphthalein end point. The number of milliliters of the standard HCl solution required is thus expressed as a soluble alkalinity. While the relative alkalinity of the reaction mixture may be determined by use of a pH meter, the pH reading obtained is not necessarily the correct value due to the error introduced by the presence of magnesium hydroxide and the concentration of salts dissolved in the mother liquor. When a calomel-glass electrode system is used in determining a pH of the slurry, an apparent pH in the range of 9.3 to about 10.4 is required which corresponds to the soluble alkalinity expressed above. The relationship between the apparent pH and the soluble alkalinity may be seen in Example I where the alkalinity is expressed by both methods.

The filter rate of the magnesium hydroxide product obtained is affected by the alkalinity of the reaction mixture. The filtering rate very rapidly increases when the alkalinity is increased from 1/2 to 1.5 ml. A maximum rate is realized at an alkalinity in the range of 1.5 to 3.0 ml. and then the rate rapidly decreases to an alkalinity of around 5 after which it begins to level off.

In addition to obtaining the most rapidly filterable particles of magnesium hydroxide, the product obtained is more easily disintegrated into fine crystals of magnesium hydroxide when the alkalinity is maintained in the above range of 0.5 to 5 ml. A suspension of the product of maximum stability is obtained when the reaction is carried out at a soluble alkalinity of about 1 to 3 ml.

To obtain the desired product it is essential to carry out the reaction in a continuous process. Aqueous solutions of the magnesium salt and of the soluble hydroxide may be continuously charged to a stirred reactor where the salt and the hydroxide are reacted to produce magnesium hydroxide. The ratio or amount of the individual streams can be adjusted so that the reaction mixture will have the desired soluble alkalinity and a preferred retention time of about one hour. The concentration of the aqueous solutions used is not critical. In using more concentrated solutions less material has to be handled to obtain a given amount of product. With the solution generally used, the reactor is stirred or agitated to intermix the reactants so that high concentration gradients are not obtained. Since violent agitation or stirring has a tendency to disintegrate the loosely aggregated particles of magnesium hydroxide, excessive agitation is to be avoided and the reactants are only sufficiently stirred or agitated to intermix them.

While aqueous solutions of magnesium chloride or magnesium sulfate may be used, magnesium sulfate is preferred. Generally a solution containing from 10 to 35 percent by weight of the salt is employed. The concentration of the sodium hydroxide solution used is generally in the range of 5 to 20 weight percent. Effluent from a caustic or chlorine cell containing sodium chloride in addition to sodium hydroxide is satisfactory and generally preferred. The solution generally contains from 7 to 12 percent sodium hydroxide and a sufficient amount of sodium chloride to substantially saturate it.

In the preparation of the magnesium hydroxide product, the presence of sulfate in the product in even small amounts is undesirable. The presence of sulfate results in an inferior periclase when the magnesium hydroxide is calcined and used for this purpose. A contaminant is never desirable in a magnesium hydroxide product which is used for pharmaceutical purposes but the sulfate is especially undesirable since it may give a poor taste. In the precipitation of magnesium hydroxide from the reactants, the magnesium hydroxide has a tendency to adsorb, or by some other means, carry down a small amount of sulfate upon precipitation. It has been found in the work leading to this invention that the presence of sodium chloride in the reaction mixture decreases this tendency of the magnesium hydroxide to carry down the sulfate. This advantage is obtained even in a batch process. While small amounts of sodium chloride will markedly decrease the sulfate pick-up, improved results are obtained when the sodium chloride concentration is in the range of about 2 weight percent to saturation in the reaction mixture preferably in the range of 5 to 12 weight percent. The effluent from caustic or chlorine electrolytic cells contains sodium chloride and thus may be used.

To illustrate the effect of alkalinity on the magnesium hydroxide product obtained, a pilot plant was operated wherein a series of runs was made reacting magnesium sulfate and sodium hydroxide under different alkalinities. The reactor had a volume of 110 gallons and was equipped with baffles and a turbine agitator. The effluent from the reactor was discharged to an Oliver rotary drum filter which was equipped with an Orlon filter cloth.

A magnesium sulfate solution containing approximately 26 weight percent of magnesium sulfate and an electrolytic chlorine cell effluent containing in aqueous solution 8.2 percent of sodium hydroxide and 16 percent of sodium chloride were continuously charged to the reactor at a rate of 0.475 gallon per minute of magnesium sulfate and 0.98 gallon per minute of the cell effluent. The level in the reactor was maintained such that approximately 87 gallons of reaction mixture was present in the reactor at all times giving an average retention time of 1.0 hour. The agitator was operated at 160 to 200 r.p.m. and was of a turbine type having 6 one and one-quarter inch wide blades ten inches in diameter. The effluent from the reactor was discharged to a filter where the resulting slurry was filtered and washed. Samples of the washed magnesium hydroxide were then slurried to form a dispersion and passed through a homogenizer. The resulting suspensions were diluted with $H_2O$ to 8 weight percent of magnesium hydroxide and these suspensions were analyzed after 7 days to determine the volume percent of the dispersion which had become clear due to the settling of the solids.

The stability data of the suspensions were based upon using a Waring Blendor. Suspensions obtained with a Manton-Gaulin two-stage valve type homogenizer operated at 5,000 pounds per square inch gauge give more stable suspension. For example with a two-stage valve type homogenizer in runs 2 and 4 suspensions were obtained which showed only 1 and 3 volume percent, respectively, of clear solution after settling for 7 days.

To determine the filter rates, samples were periodically taken from the effluent coming from the reactor and filtered in a Buchner funnel at 24 inches of vacuum until a cake of 1 inch thickness was obtained. The volume of the filtrate was measured and the average filtering rate to build up a 1 inch cake was determined.

The pertinent data and the results obtained are shown in the table below:

| Run No. | Slurry, pH | Filtrate Soluble Alkalinity | Average Filter Rate for 1″ Cake g.p.h./ft.² | Percent $Mg(OH)_2$ in Cake | Chem. Anal. of Dry $Mg(OH)_2$ | | 8% Suspension Stability, Volume Percent of Clear Solution After 7 Days of Settling |
|---|---|---|---|---|---|---|---|
| | | | | | Percent Cl | Percent $SO_4$ | |
| 1 | 9.5 | 0.7 | 24.5 | 28.3 | .06 | 1.88 | 13.2 |
| 2 | 9.8 | 1.3 | 36.8 | 33.1 | .02 | 1.10 | 3.0 |
| 3 | 10.0 | 2.4 | 35.5 | 35.2 | .04 | 1.05 | 6.0 |
| 4 | 10.0 | 3.0 | 39.3 | 32.6 | .04 | 1.07 | 7.0 |
| 5 | 10.0 | 3.8 | 34.8 | 42.1 | .07 | .84 | 17.0 |
| | 10.5 | 6.9 | 19.9 | 35.8 | .06 | .86 | 20.0 |

In run 3 above a sample of the magnesium hydroxide product obtained from the filter was viewed under a microscope. The product had an average particle size in the range of 35 to 45 microns and appeared to be composed of a group or cluster of smaller crystals.

A run similar to the runs above was made except that a 20.6 weight percent solution of magnesium chloride was used in place of the magnesium sulfate solution. An alkalinity of 1.5 ml. was employed. The average filter rate obtained was 38.8 gallons per hour per square foot. The cake contained 34.8 percent magnesium hydroxide which upon drying was found to contain 0.13 weight percent chloride and 0.29 weight percent sulfate. A suspension of 8 weight percent had a 7 day stability of 19.4 percent on the same basis used above.

To show the effect of the presence of sodium chloride in the reaction mixture in decreasing the sodium sulfate pick-up, a run similar to the runs above was made wherein a sodium hydroxide solution containing 8 percent sodium hydroxide was used. The solution was obtained by dissolving sodium hydroxide in water so that the resulting solution did not contain sodium chloride. The reactor was maintained at the soluble alkalinity of 1.0 ml. The product obtained upon analysis was found to contain no chloride and 2.04 percent of sulfate.

What is claimed is:

1. A process for the preparation of a readily filterable magnesium hydroxide which comprises admixing magnesium sulfate in aqueous solution, while maintaining continuous agitation, with sodium hydroxide, containing sodium chloride admixed therewith, in aqueous solution, at a temperature between about 15° C. and 75° C. for between about 0.25 and 2.0 hours, in proportions of each sufficient to provide a soluble alkalinity that requires between 0.5 and 5.0 milliliters of 0.1 N hydrochloric acid to neutralize 100 milliliters of the resulting mother liquor, to make magnesium hydroxide in suspension, and recovering the magnesium hydroxide so made from the suspension at said alkalinity.

2. A process according to claim 1 wherein the magnesium sulfate and the sodium hydroxide are intermixed in proportions such that a soluble alkalinity is obtained which requires between about 1 and 3 milliliters of 0.1 N hydrochloric acid to neutralize 100 milliliters of the resulting mother liquor, and the sodium chloride concentration in the reaction mixture is in the range of between about 2 weight percent and saturation.

3. The continuous process for the preparation of magnesium hydroxide according to claim 1 wherein the aqueous magnesium sulfate solution employed contains between 10 and 35 weight percent of magnesium sulfate, the aqueous alkali metal solution employed is a sodium hydroxide solution which contains between 5 and 20 weight percent of NaOH, and there is provided, in the resulting aqueous reaction mixture, sodium chloride in an amount sufficient to result in between 5 weight percent and the point of saturation of sodium chloride therein.

References Cited in the file of this patent

UNITED STATES PATENTS

| | | |
|---|---|---|
| 2,089,339 | Chesny | Aug. 10, 1937 |
| 2,168,228 | MacArthur | Aug. 1, 1939 |
| 2,255,422 | Heath et al. | Sept. 9, 1941 |
| 2,405,055 | Robinson et al. | July 30, 1946 |
| 2,415,074 | Clark et al. | Feb. 4, 1947 |